CELESTIA A. STEVENSON.
Heaters for Flat Irons.
No. 154,425.                                Patented Aug. 25, 1874.
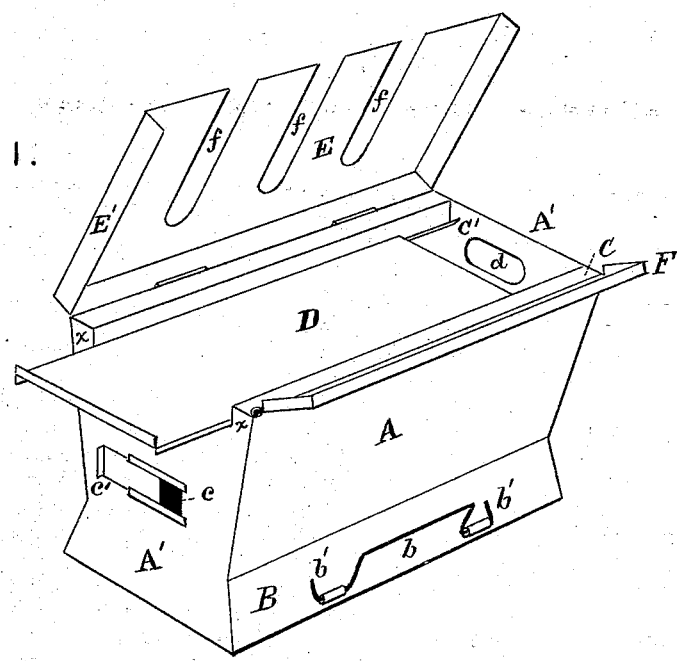
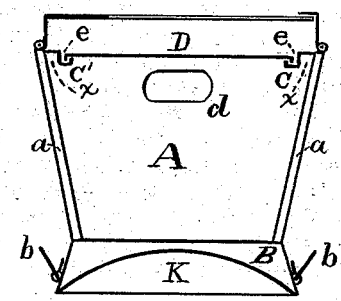
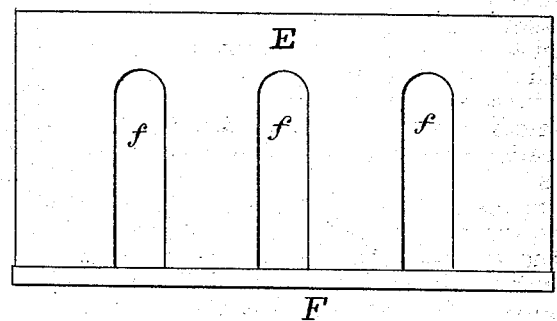
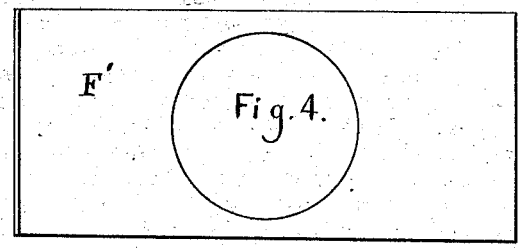
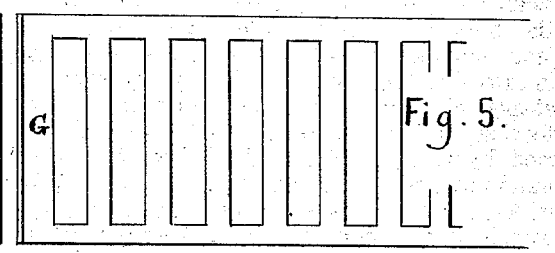
Witnesses:  
Alonzo Hughes  
H. S. Miller  
Inventor:  
Celestia A. Stevenson  
by Louis Bagger, her Atty.

UNITED STATES PATENT OFFICE.

CELESTIA A. STEVENSON, OF OLATHE, KANSAS.

IMPROVEMENT IN HEATERS FOR FLAT-IRONS.

Specification forming part of Letters Patent No. 154,425, dated August 25, 1874; application filed July 18, 1874.

*To all whom it may concern:*

Be it known that I, CELESTIA A. STEVENSON, of Olathe, in the county of Johnson and State of Kansas, have invented certain new and useful Improvements in Heaters for Flat-Irons; and I do hereby declare that the following is a full, clear, and exact description thereof, which will enable others skilled in the art to which it pertains to make and use the same, reference being had to the accompanying drawings and to the letters of reference marked thereon, which form a part of this specification.

Figure 1 is a perspective view. Fig. 2 is a transverse vertical section. Fig. 3 is a top plan; and Figs. 4 and 5 represent attachments to my improved heater, to be applied when it is desired to use this for cooking or broiling purposes.

Similar letters of reference indicate corresponding parts in all the figures.

My invention consists in the improvement of charcoal-stoves for heating flat-irons, as hereinafter described, and pointed out in the claims.

A represents the body of my improved heater, which is preferably made of sheet-iron, and has an outer casing of tin, (shown at $a$,) by which an air-chamber is formed all around the stove. The two end pieces A′ are vertical, but the sides A project outward from the bottom, as shown. The foot B also projects outward in a downward direction, and is provided with handles $b$, with projecting staples $b'$, which rest against the sides of the foot, so that the stove may be lifted and carried by these handles without danger of the hands coming in contact with the hot surface of the sides. $c$ is the draft-opening, which is regulated by a sliding shield, $c'$; and $d$ is the draft-tube or chimney, placed in the wall opposite. Along the top edge of the two long sides A, on the inside, is fastened a grooved shelf, C and C′, of the conformation shown more clearly in Fig. 2. These two opposite shelves run the entire length of the stove, and form a recess and support for the heating-plate D, which consists of a piece of sheet-iron, bent down longitudinally at the sides to fit into the grooves $e$ in the shelves C C′, and it is also bent up at one end, as shown in the perspective view, Fig. 1, so as to form a convenient handle, by which it may be easily withdrawn when it is desired to replenish the fire.

It will be observed, from Fig. 2, that the conformation of these grooved shelves C and C′ is such as to form a recess on that side of the said shelves which abuts upon the walls of the heater. Thus a flue, $x$, is formed, by which the heat from the burning charcoal within the heater is conducted around the sides facing it of the body of the flat-irons placed upon D, thereby heating them quicker and more thoroughly.

E is the cover, which is hinged upon one of the long sides, and is provided with a rim, E′, encircling three of the sides. The fourth side, opposite the hinged side, is open, but may be closed by shutting the lateral cover F up upon the top cover E. This side cover is hinged upon the long side opposite the one to which E is hinged, and is provided with projecting sides or flanges that lap over the open side of E, thus, when both covers are closed, forming an inclosed heating-chamber between the plate D, sides E′ and F, and top E. The top E is slotted transversely at $fff$, to make room for the projecting handles of the flat-irons when placed on the plate D.

Sometimes it may be found convenient to remove the plate D and substitute for it the broiler G or the perforated plate F′. (Shown in Figs. 4 and 5.) By this arrangement my heater may be used as a convenient summer-stove for cooking and broiling meats, toasting, &c. When used as a broiler the cover E and also F may be closed, by which the heat is partially retained, while at the same time burning is prevented, as the air has access through the openings $fff$.

The bottom K of the heater may be made of cast-iron instead of sheet-iron, and thus rendered more durable. When made of cast-iron, I prefer to give it the form shown in Fig. 2—that is, with a concave under side. When the heating-plate D, through constant use, is burned through, it may easily be replaced with little trouble, and at a cost merely nominal.

I am aware that heaters for flat-irons or similar articles have been before constructed with a heating-chamber having a slotted cover, and also that other of the features embodied in my improved heater are not new. I do not, therefore, claim the heater herein described, broadly; but What I do claim, and desire to secure by Letters Patent, is as follows:

1. In a heater for flat-irons or for similar purposes, the interior shelves C C', having the outside grooves $e$ and interior flues $x$, substantially as and for the purpose specified.

2. The combination of the removable and changeable heating-plate D with the shelves C C' and fire-chamber A, substantially as and for the purpose specified.

3. The combination of the fire-chamber A, shelves C C', removable heating-plate D, and hinged covers E and F, substantially as and for the purpose specified.

In testimony that I claim the foregoing as my own I have hereunto affixed my signature in presence of two witnesses.

CELESTIA A. STEVENSON.

Witnesses:
ARCH SHAW,
J. H. McCARTNEY.